United States Patent [19]
Phillips

[11] Patent Number: 4,642,074
[45] Date of Patent: Feb. 10, 1987

[54] CHAIN-SPROCKET DRIVE

[75] Inventor: Charles F. Phillips, Newfield, N.Y.

[73] Assignee: Emerson Electric Co., St. Louis, Mo.

[21] Appl. No.: 771,723

[22] Filed: Sep. 3, 1985

[51] Int. Cl.$^4$ ............................................. F16H 7/06
[52] U.S. Cl. ..................................... 474/156; 474/206
[58] Field of Search ............... 474/156, 155, 205, 206, 474/188, 189, 198, 213

[56] References Cited

U.S. PATENT DOCUMENTS

| | | | |
|---|---|---|---|
| 342,567 | 5/1886 | Bernhardt | 474/212 |
| 667,971 | 2/1901 | Clouser | 474/206 |
| 755,707 | 3/1904 | Schmidt, Jr. | 474/206 |
| 959,046 | 5/1910 | Belcher | 474/213 |
| 1,835,406 | 12/1931 | Kirsten | 474/156 |
| 2,884,798 | 5/1959 | Wilson | 474/156 |

FOREIGN PATENT DOCUMENTS

| | | | |
|---|---|---|---|
| 0020230 | of 1895 | United Kingdom | 474/156 |
| 0001938 | of 1897 | United Kingdom | 474/156 |

Primary Examiner—Stephen J. Novosad
Assistant Examiner—Thuy M. Bui
Attorney, Agent, or Firm—Aubrey L. Burgess

[57] ABSTRACT

A drive chain-sprocket combination comprising a chain constructed of alternate single toed or toothed links and links, similar to British Standard roller chain links, joined by pivot means meshing with sprockets formed of outer members and a central spacer of a second and lesser diameter having cavities matching the toes of the toed links. The outer members extend radially beyond the central spacer and provide rims which act as guides to maintain chain-sprocket engagement.

9 Claims, 8 Drawing Figures

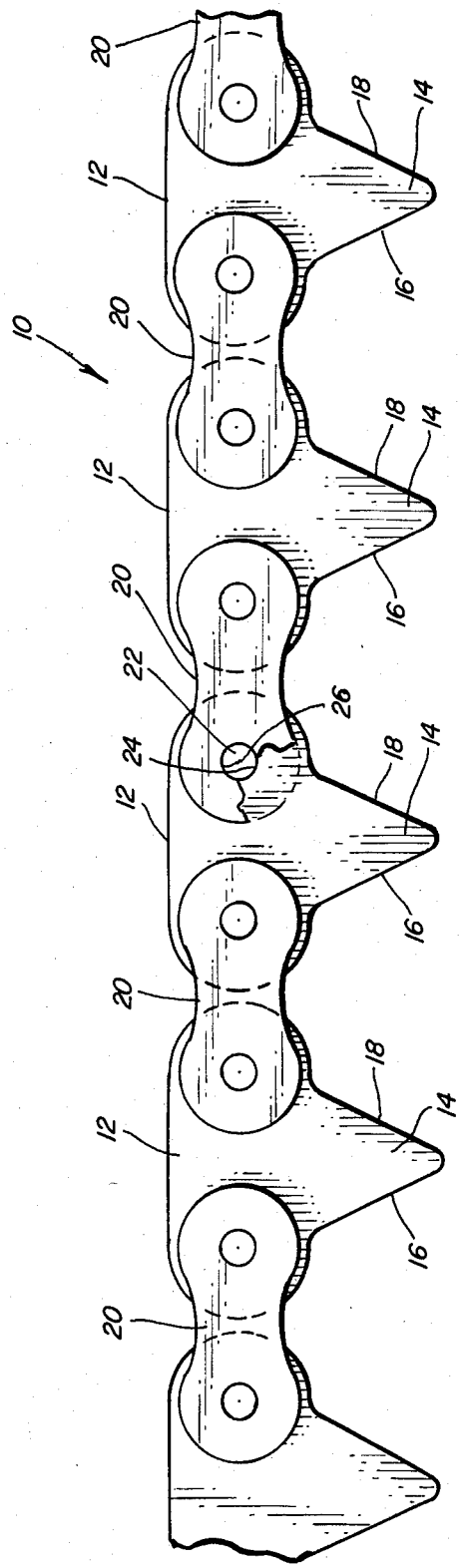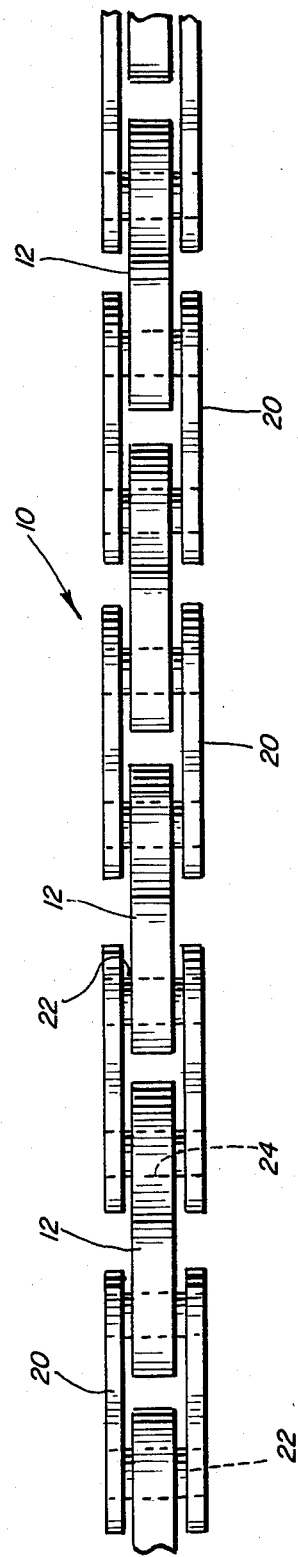

CHAIN-SPROCKET DRIVE

BACKGROUND OF THE INVENTION

1. Field of the Invention

This invention relates to improved chain-sprocket drive assemblies for hoists, conveyors, and similar uses.

2. Description of Prior Art

Clouser, U.S. Pat. No. 667,971, issued Feb. 12, 1901, discloses a chain-sprocket drive in which the chain is constructed as a "crossing sprocket-chain", i.e., the chain forms a figure eight when in use. The chain has sets of teeth projecting from both edges, one set of teeth engaging one sprocket and the other set of teeth on the other edge engaging the other sprocket. Each link is constructed of two plates; each link has the same outline. The sprockets are each constructed of two parallel plates separated by rollers of some indeterminate and not disclosed length for engagement by the links.

Schmidt, Jr., U.S. Pat. No. 755,707, issued Mar. 29, 1904, discloses a chain-sprocket drive in which the chain is constructed of a series of identical links arranged in ranks, the ranks being interleaved and connected by pivots. Each link has one toe or projection (7) and the projections are received in the space between the adjacent sprocket teeth.

Belcher, U.S. Pat. No. 959,046, issued May 24, 1919, discloses a chain-sprocket drive in which the chain is constructed of two-toed links arranged in interleaved ranks joined by pivot means. Spaced along the outside of the chain are one toed links which serve as guide links for the chain.

Bernhardt, U.S. Pat. No. 342,567, issued May 25, 1886, teaches chain gearing, the chain being constructed of toed links alternating with connecting links. A special pulley is provided for engagement with the chain.

SUMMARY OF THE INVENTION

The invention herein described relates to a chain and sprocket drive assembly especially adaptable for relatively low speed and medium duty applications, such as conveyors, hoists and the like. The chain comprises a plurality of spaced links, each having a single depending tooth or toe, the flanks defining the toe or tooth being generally straight, thus defining a generally V-shaped tooth. Alternating with and pivotally connected with these links are spaced pairs of links similar in shape to the British Standard roller chain links. Pivot means join the assembly and permit articulation of the assembly. The pivot means are illustrated as round pins which can be peened over at the ends. Other forms of pivot means can be used without departing from the spirit of this invention.

Each sprocket with which the chain meshes comprises a pair of spaced, generally circular outer members flanking a central, generally circular spacer having a thickness slightly in excess of the thickness of the toed links. The central spacer is provided with a plurality of spaced indentations to receive the toes or teeth of the links. The central spacer is thus configured as a toothed member sandwiched between the two outer members. The outer members have a slightly greater diameter than the central spacer to provide radially extending rims which serve as guides for the chain, preventing sidewise movement of the chain off the sprocket.

For heavier duty applications, the chain can be made of alternate sets or ranks of single toothed links and non-toothed links to mesh with a sprocket having a plurality of discs of one diameter spacing inner parts having tooth receiving cavities.

BRIEF DESCRIPTION OF THE DRAWINGS

FIG. 1 is a side elevation view of a portion of a chain constructed according to this invention;

FIG. 3 is a top plan view of the chain of FIG. 1;

DETAILED DESCRIPTION OF THE PREFERRED EMBODIMENT

Figure 2:
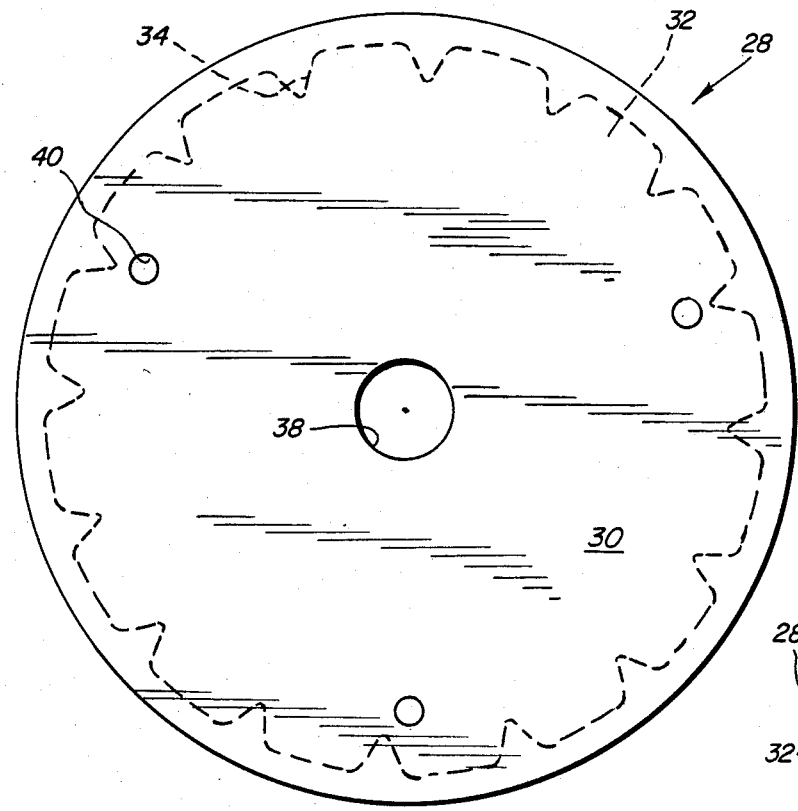
FIG. 2 is a side elevation view of a drive sprocket constructed according to this invention.

Looking at FIGS. 1 and 3 of the drawings, the chain of this invention, referenced as 10, comprises a plurality of single toed or toothed links 12, each toe or tooth being referenced as 14. The toes or teeth are defined by generally straight flanks 16, 18. The links 12 alternate with pairs of links 20, 20, which flank the links 12, as clearly shown in FIG. 3. Pivot means 22 received in aligned apertures 24 (in links 12) and 26 (in links 20) join the links together and permits articulation of the assembly of links. The pivot means are shown as round pins which can be peened over at their ends. Other known pivot means can be used without departing from the spirit of the invention. While only a segment of a chain is shown, it is to be understood that the chain as used is an endless loop; the chain is assembled in a continuous assembly of links and pivot means, and defined lengths are broken out and joined to form endless loops.

The toed or toothed links 12 are illustrated as being thicker than the links 20; preferably the thickness of a pair of links 20 equals the thickness of a single link 12 to equate the strength of every section of the chain.

Figure 4:
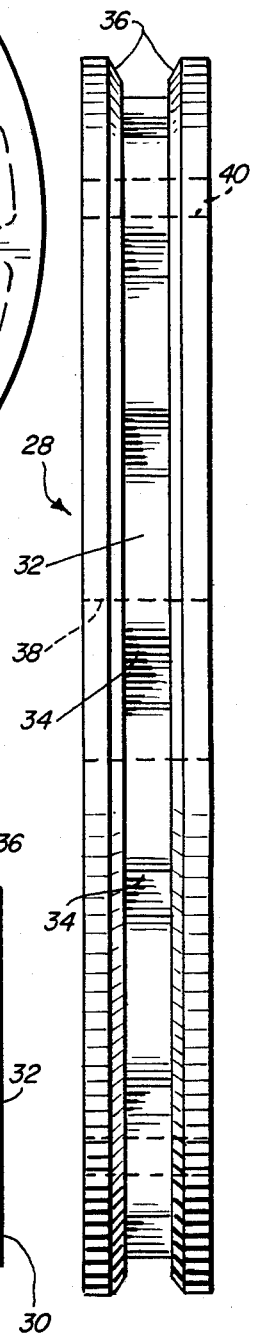
FIG. 4 is a sectional view of the sprocket of FIG. 2 taken on line 4—4 of FIG. 2.
Figure 5:
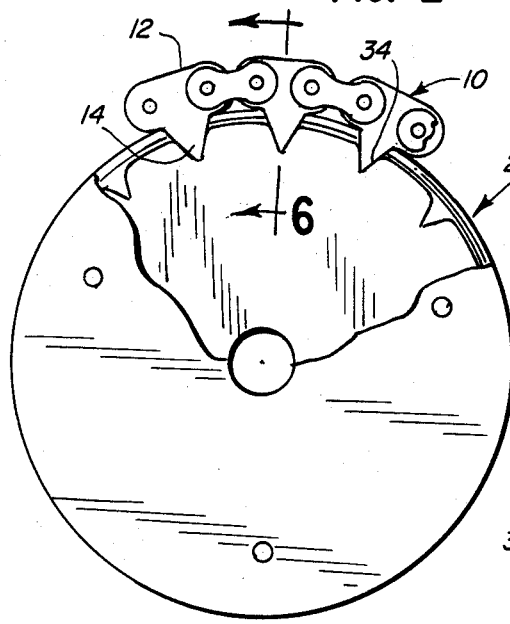
FIG. 5 is a partial view with parts broken away showing the chain of FIGS. 1 and 3 meshing with the sprocket of FIGS. 2 and 4.
Figure 6:
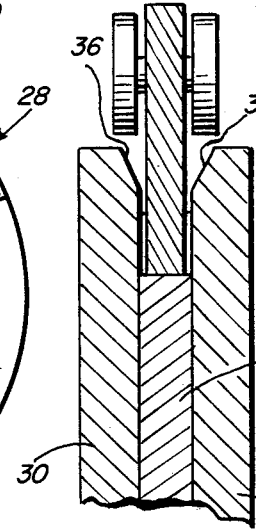
FIG. 6 is a view taken on line 6—6 of FIG. 5.

A sprocket for use with the chain is illustrated in FIGS. 2 and 4 and is referenced as 28, it being understood that the chain meshes with two or more sprockets in a drive mechanism; however, only one sprocket is illustrated here, the other sprocket(s) being substantially the same construction. The sprocket 28 comprises a pair of discs or circular members 30, 30, separated or spaced by a generally circular spacer 32 having a diameter less than that of the discs 30 and a thickness slightly in excess of the thickness of the toed or toothed links 12. The periphery of the spacer 32 is provided with a plurality of spaced cavities 34 of a shape generally matching that of the toes 14 of the links 12. The spacing of the cavities is such that successive toes engage successive cavities. When the toes of the links are slightly less in width than the width of the cavities, less noise is generated than when the toe and cavity width are substantially equal. The inner peripheries of the discs 30 are preferably beveled at 36 for smooth operation of the assembly. The discs 30 because they extend radially beyond the central spacer 32 define rims which serve as guides to maintain the chain on the sprocket. The meshing of the chain and sprocket is illustrated in FIGS. 5 and 6, where the same reference characters are used to refer to like parts.

The sprocket can be centrally bored at 38 to a customer's specifications and is be provided with holes 40 to receive fastening means for assembly purposes and also for attachment to a customer's machinery. The links are ususally stamped from strip steel, the pivot means can be cut from metal rod and perhaps hardened, and the sprockets are usually assembled from stamped, usually metal, parts. Expensive machining of the parts is substantially eliminated.

The chain-sprocket combination of the embodiment just described provides a positive drive system especially usable in medium duty applications, such as conveyors and the like, and requires little space because of its relatively narrow thickness.

Figure 7:
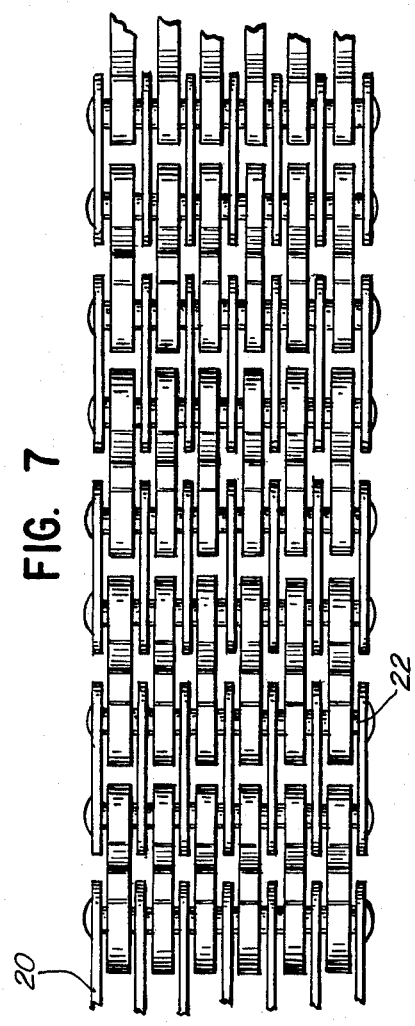
FIG. 7 is a top plan view of another form of chain constructed according to this invention.
Figure 8:
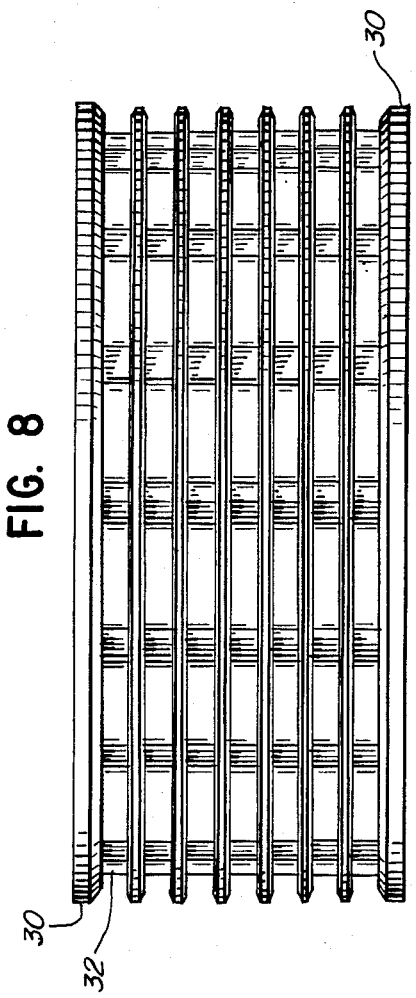
FIG. 8 is a top view of a sprocket construction for use with the chain of FIG. 7.

In another form of the invention where increased strength is required, illustrated in FIGS. 7 and 8, a wide chain 100 comprises a plurality of single toed or toothed links 12 and a plurality of links 20 laced as illustrated in FIG. 7, the links 12 and links 20 being arranged in alternate transverse ranks or sets 102, 104 connected by pivot means 106 received in aligned apertures (not shown). The chain 100 is constructed to mesh with a sprocket 108 comprising outside discs 110 and spaced central members 112, the latter being of less diameter than the discs 110 and spaced by members 114, each of a diameter substantially equal to that of the discs 110. The spacing of the members 112 is such that each is provided with a series of spaced cavities 114 to received the toes of the longitudinally arranged links 12 of the sets of links. Other patterns of link lacing and sprocket arrangement can be used without departing from the spirit of the invention. The sprocket 108 can be constructed of parts stamped from sheet material.

The appended claims are intended to cover all reasonable equivalents of the invention and are to be construed as broadly as the prior art will permit.

I claim:

1. A power transmission drive chain and sprocket combination comprising:
    a series of individual links each having a single depending toe or tooth defined by generally straight converging flanks and a pair of spaced apertures;
    alternate pairs of toeless or toothless links joining said series of links, one on each side of said links of said series and each having an aperture aligned with an aperture of a link of said series of links;
    pivot means in each set of aligned apertures and joining said links to form a chain; and
    a sprocket having a pair of circular members spaced apart by a central generally circular spacer having a diameter less than that of said members and a thickness slightly in excess of the thickness of said toed links, said central spacer having a plurality of spaced cavities substantially equal to the dimensions of said toes of said toed links and each cavity being adapted to be substantially fully engaged by said toed links in sequence.

2. A chain and sprocket combination as recited in claim 1, in which said sprocket is formed of three pieces, each piece being stamped from sheet material and joined together.

3. A chain and sprocket combination as recited in claim 1, in which said circular members extend radially beyond the central spacer and form rims which act as guides for said chain so as to maintain the chain on the sprocket.

4. A generally circular sprocket for use in a toothed positive chain-sprocket drive comprising outer portions and a central portion, said central portion having a diameter less than said outer portions, said outer portions forming rims flanking said central portion; and means defining tooth spaces of a shape of the teeth of said chain in said central portion for positively engaging the toothed portions of said chain.

5. A sprocket for use in a tooth chain-sprocket drive, said sprocket comprising:
    a pair of circular side plates;
    a circular spacer between said side plates;
    said spacer having a diameter less than the diameter of said side plates; and
    a plurality of cavities in said spacer to receive the teeth of said chain;
    said cavities being similar in shape and size to the teeth of said chain;
    said side plates forming rims around said spacer to provide guiding means for said chain.

6. A sprocket as recited in claim 5, in which said cavities are evenly spaced in said spacer.

7. A power transmission drive chain and sprocket combination comprising:
    a series of transverse sets of links each having a single depending toe or tooth and a pair of spaced apertures aligned as sets with those in the set of links:
    alternate transverse sets of toeless or toothless links joining said series of single toe links and laced therewith, each of said toeless links having spaced apertures, one set of apertures being aligned with a set of apertures of said toothed links;
    pivot means in each set of aligned apertures joining the links together;
    a sprocket having a pair of circular members spaced by alternate spacers of lesser diameter and discs of generally the same diameter, said spacers having a plurality of cavities of substantially the shape and size of said toes of said toed links to receive and be engaged by teeth of the links.

8. A power transmission drive chain and sprocket combination as recited in claim 7, wherein said sprocket is formed of multiple pieces, each piece being stamped from sheet material and joined together.

9. A sprocket for use in a tooth chain-sprocket drive, said sprocket comprising:
    a pair of circular side plates;
    circular spacers between said side plates;
    said spacers having a diameter less than the diameter of said side plates;
    a plurality of cavities in said spacers to receive the teeth of said chain;
    said cavities being similar in shape and size to the teeth of said chain;
    said side plates forming rims around said spacers to provide guiding means for said chain; and
    separator mean between adjacent spacers, said separator means having a diameter substantially the same as said side plates.

* * * * *